(12) United States Patent
Kraszewski (10) Patent No.: US 12,285,706 B2
(45) Date of Patent: Apr. 29, 2025

(54) FILTER PRESS AND WASHER FOR FILTER PLATE APPARATUS

(71) Applicant: FLSmidth A/S, Valby (DK)

(72) Inventor: Mike Kraszewski, Holladay, UT (US)

(73) Assignee: FLSmidth A/S (DK)

( * ) Notice: Subject to any disclaimer, the term of this patent is extended or adjusted under 35 U.S.C. 154(b) by 427 days.

(21) Appl. No.: 17/776,499

(22) PCT Filed: Nov. 12, 2020

(86) PCT No.: PCT/IB2020/060664
§ 371 (c)(1),
(2) Date: May 12, 2022

(87) PCT Pub. No.: WO2021/094978
PCT Pub. Date: May 20, 2021

(65) Prior Publication Data
US 2022/0379243 A1    Dec. 1, 2022

Related U.S. Application Data

(60) Provisional application No. 62/934,193, filed on Nov. 12, 2019.

(51) Int. Cl.
*B01D 25/164*    (2006.01)
*B01D 25/38*    (2006.01)

(52) U.S. Cl.
CPC ......... *B01D 25/386* (2013.01); *B01D 25/164* (2013.01)

(58) Field of Classification Search
CPC .............................. B01D 25/164; B01D 25/386
See application file for complete search history.

(56) References Cited

U.S. PATENT DOCUMENTS

| | | | |
|---|---|---|---|
| 4,107,042 A * | 8/1978 | Heinrich | B01D 25/386 210/231 |
| 5,846,415 A | 12/1998 | Tsuchida | |
| 2018/0345178 A1* | 12/2018 | Morris | B01D 25/164 |

FOREIGN PATENT DOCUMENTS

GB    2185904 A    8/1987

OTHER PUBLICATIONS

The International Search Report and Written Opinion dated Feb. 11, 2021, 8 pages. The Positive International Preliminary Report on Patentability dated Nov. 4, 2021, 17 pages.

* cited by examiner

*Primary Examiner* — Bradley R Spies
(74) *Attorney, Agent, or Firm* — Jeffrey A. Sharp (57) ABSTRACT

A horizontal filter press (100) is provided with a track (105) and a plurality of filter plate assemblies (101) supported by side bars (104). A washer carriage (2), which is movably supported on the track (105), includes a washer unit (1) for washing the filter plate assemblies (101). The washer unit (1) may include a wash water manifold (11) having a first outlet (13) for feeding wash water to a first spindle (19) and a second outlet (14) for feeding wash water to a second spindle (19). Each of the spindles (19) may include a reel (20) for spooling a flexible hose (23) thereon, and they are each configured to be rotated with respect to the washer carriage (2). A first end of a spray bar (25) fluidly communicates with a first flexible hose (23) supported by a reel (20) on the first spindle (19).

11 Claims, 10 Drawing Sheets

FIG. 13

FILTER PRESS AND WASHER FOR FILTER PLATE APPARATUS

CROSS-REFERENCE OF RELATED APPLICATIONS

None.

FIELD OF THE INVENTION

This invention relates to filtration devices such, in particular, horizontal filter presses. More particularly, embodiments relate to improved apparatus for washing filter plate assemblies comprising filter media.

BACKGROUND OF THE INVENTION

Horizontal filter presses typically comprise a plurality of horizontally-stacked, vertically-oriented filter plate assemblies which are supported by parallel side bars, for the purpose of filtering. Plate assemblies are held together closed during a filtration cycle by the use of one or more hydraulic cylinders. The filter is opened by pulling the plate assemblies apart, allowing cake to fall from the filter plate assemblies. It is beneficial, e.g., after dropping the cake, to clean the filter media (i.e., "filter cloth") portion of the filter plate assemblies by shaking and/or by washing the filter plate assemblies.

Traditionally, washing structures are incorporated into sprayer bars of each filter plate assembly. Each sprayer bars comprise a number of sprayer nozzles. Problems associated with such devices include increased costs to manufacture, increased weight, and problems identifying clogged/scaled sprayer nozzles. Moreover, because the sprayer bars (and their sprayer nozzles) are fixed above each filter plate, their effectiveness in washing lower portions of filter media provided to each filter plate assembly is limited. Another problem associated with such prior devices is that the sprayer bar is shaken with the rest of the filter plate assembly, thereby increasing probability of manifold cracking, leaking, bent sprayer nozzles, or broken fittings.

Other means for washing have been proposed, for example, as shown and described in WO 2015/127366 A2, which is hereby incorporated by reference in its entirety for any and all purposes, as if fully set forth herein. However, problems with such washer mechanisms include higher center of mass, and requirements for large ceiling height and above-filter clearance requirements for allowing washer structures to extend upward enough to clear the filter plate assemblies.

Yet other washing means have been proposed, such as those shown and described in WO/2016/179408—which is also incorporated by reference in its entirety for any and all purposes, as if fully set forth herein. However, such devices may require additional lateral clearances, and may carry with them an increased cost to manufacture.

Accordingly, it is desired to provide a cheaper, simpler, and overall improved filter plate assembly washing apparatus which overcomes the aforementioned problems associated with prior washing apparatus for horizontal filter presses.

OBJECTS OF THE INVENTION

It is, therefore, an object of certain embodiments of the invention, to provide an improved horizontal filter press or improved filter plate assembly washing apparatus therefor, which overcomes the aforementioned problems associated with conventional washing apparatus.

These and other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A horizontal filter press (100) is disclosed. The horizontal filter press (100) may have a plurality of filter plate assemblies (101) supported by side bars (104). The horizontal filter press (100) may further comprise a track (105). The horizontal filter press (100) may further comprise a washer carriage (2).

The washer carriage (2) may be movably supported on the track (105). It may comprise a washer unit (1) for washing the filter plate assemblies (101) of the horizontal filter press (100). The washer unit (1) may, in some embodiments, comprise a wash water manifold (11). The wash water manifold (11) may be equipped with a first outlet (13) for feeding wash water to a first spindle (19), and a second outlet (14) for feeding wash water to a second spindle (19). Each of the spindles (19) may comprise a reel (20) for spooling a flexible hose (23) thereon. Each of the spindles (19) may be rotatable with respect to the washer carriage (2).

The washer unit (1) may further comprise a spray bar (25). A first end of the spray bar (25) may fluidly communicate with a first flexible hose (23). The first flexible hose (23) may be supported by a reel (20) on the first spindle (19). A second end of the spray bar (25) may fluidly communicate with a second flexible hose (23). The second flexible hose (23) may be supported by a reel (20) on the second spindle (19). The spray bar (25) may be configured to receive wash water from the wash water manifold (11), for example, via the first and second spindles (19) and via the first and second flexible hoses (23), without limitation.

In some embodiments, the first and second spindles (19) may each be supported by one or more bushings or bearings (16), without limitation. In some embodiments, the first and second spindles (19) may be coupled to the first (12) and second (13) outlets of the manifold (11), respectively, for example by a hydraulic rotational fluid coupling (15), without limitation. In some embodiments, the first and second spindles (19) may comprise a hollow shaft (27). The hollow shaft (27) may be configured to receive wash water from the wash water manifold (11). The hollow shaft (27) may also be configured to deliver the wash water to the spray bar (25) via the first and second flexible hoses (23), without limitation.

In some embodiments, the first flexible hose (23) may fluidly communicate with the hollow shaft (27) of the first spindle (19) via a hydraulic fitting located adjacent to the reel (20) of the first spindle (19). Likewise, the second flexible hose (23) may fluidly communicate with the hollow shaft (27) of the second spindle (19) via a hydraulic fitting located adjacent to the reel (20) of the second spindle (19), without limitation.

When in a standby configuration, the first and the second flexible hoses (23) may be wrapped around a reel (20) provided on the first and second spindles (19), respectively. When in a wash configuration, the first and second flexible hoses (23) may be at least partially unwrapped from said reel (20) provided on the first and second spindles (19), respectively.

In some embodiments, the spray bar (25) may comprise at least one plate guide (28). The at least one plate guide (28) may be configured for aligning the spray bar (25) between two of the plurality of filter plate assemblies (101) during a wash cycle, without limitation.

In some embodiments, the washer unit (1) may comprise a drive motor (22). The drive motor (22) may be configured to rotate the first and second spindles (19) via a drive belt or chain (18), without limitation. In some embodiments, each of the first and second spindles (19) may comprise a driven pulley, gear, or sprocket (21). These driven pulleys, gears, or sprockets (21) may be adapted for engagement with the drive belt or chain (18), without limitation. In some embodiments, tensioning means (30) may be provided to the washer unit (1), to aid with tensioning of the drive belt or chain (18), without limitation. It should be understood that while not explicitly shown, each of the spindles (19) may alternatively be directly driven by their own motor (22) with or without the use of a reducer.

In some embodiments, the spray bar (25) may be fluidly coupled to the first and second flexible hoses (23) by a hydraulic fitting (24), without limitation. In some embodiments, the washer unit (1) may comprise a plurality of spray bars (25). In some embodiments, each spindle (19) may comprise a number of reels (20) and/or flexible hoses (23) which corresponds to the number of spray bars (25), without limitation. For example, as shown, a plurality of spray bars (25) may be employed, without limitation. In some embodiments, the washer carriage (2) may be movably supported on the track (105) by track followers (26). The track followers (26) may be advantageously provided with guide means (9), such as one or more rollers and/or one or more sliding surfaces, without limitation.

A method of using/operating a horizontal filter press (100) as described above is also disclosed. The method may comprise the step of rotating the first and second spindles (19). The method may further comprise raising or lowering the spray bar (25) by virtue of rotating the first and second spindles (19). Rotating the first and second spindles (19) either spools the first and second flexible hoses (23) onto, or unravels the first and second flexible hoses (23) from their respective reels (20). The method may further comprise the step of providing wash water from the manifold (11) to one of the plurality of filter plate assemblies (101) via the spray bar (25).

The step of rotating the first and second spindles (19) may comprise the step of activating a drive motor (22) provided with a drive pulley, gear, or sprocket (17). The step of rotating the first and second spindles (19) may also comprise the step of turning a belt or chain (18) operatively engaged with the drive pulley, gear, or sprocket (17). The step of rotating the first and second spindles (19) may additionally comprise the step of applying a torque to a driven pulley, gear, or sprocket (21) provided to each of the first and second spindles (19) (e.g., the belt or chain (18) may apply the torque to each driven pulley, gear, or sprocket (21)).

In some embodiments, the method may further comprise the step of lowering the spray bar (25) between two of the plurality of filter plate assemblies (101). This may involve the step of allowing the at least one plate guide (28) to align the spray bar (25) between said two of the plurality of filter plate assemblies (101) during a wash cycle.

It will be appreciated from this disclosure, and the drawings, that various features/components and method steps described herein may be altered without significantly departing from the scope of the invention.

BRIEF DESCRIPTION OF THE DRAWINGS

To complement the description which is being made, and for the purpose of aiding to better understand the features of the invention, a set of drawings illustrating preferred apparatus and methods of using the same is attached to the present specification as an integral part thereof, in which the following has been depicted with an illustrative and non-limiting character. It should be understood that like reference numbers used in the drawings may identify like components.

In the following, the invention will be described in more detail with reference to drawings in conjunction with exemplary embodiments.

DETAILED DESCRIPTION OF THE INVENTION

Figure 13:
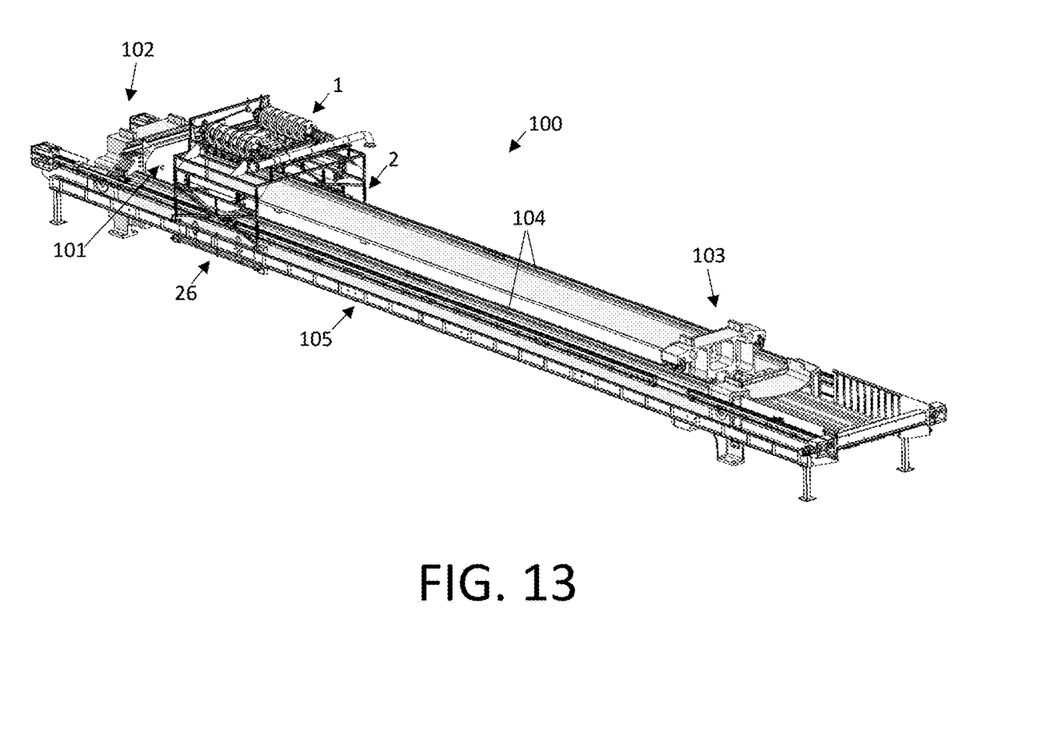
FIG. 13 is an isometric view of a horizontal filter press 101 comprising a washer carriage 2 equipped with a washer unit 1 according to the embodiment shown in FIGS. 1-12d. For clarity, most of the filter plate assemblies 101 have been omitted from FIG. 13.

A horizontal filter press 100 comprises a plurality of vertically-oriented, horizontally-stacked filter plate assemblies 101. The filter plate assemblies 101 rest on a pair of side bars 104 which run parallel to each other from a head end 102 to a tail end 103 of the horizontal filter press 100. The horizontal filter press 100 further comprises a track 105 running along an operable length of each side the horizontal filter press 100. The tracks 105 run generally parallel with the side bars 104.

Figure 7:
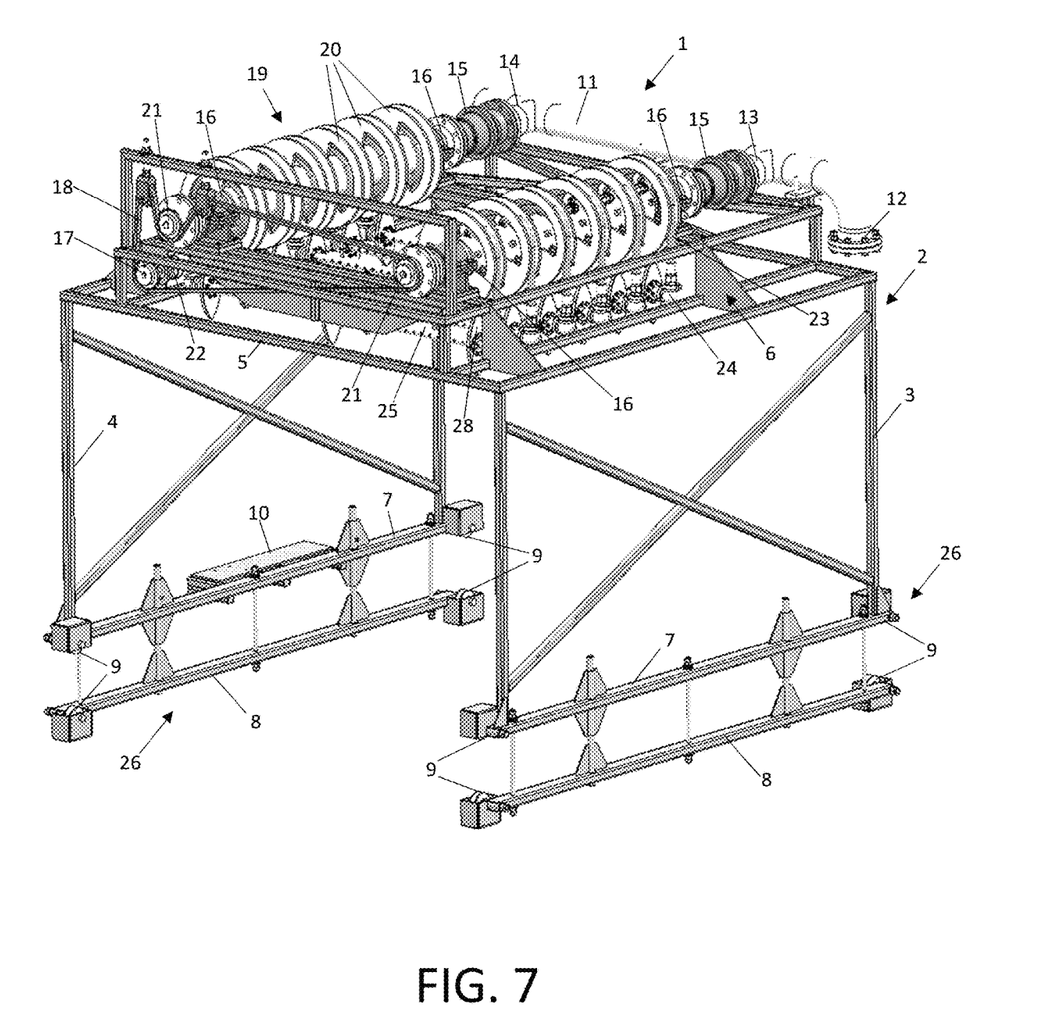
FIG. 7 shows an isometric view of a washer unit 1 mounted to a washer carriage 2 according to some embodiments.
Figure 8:
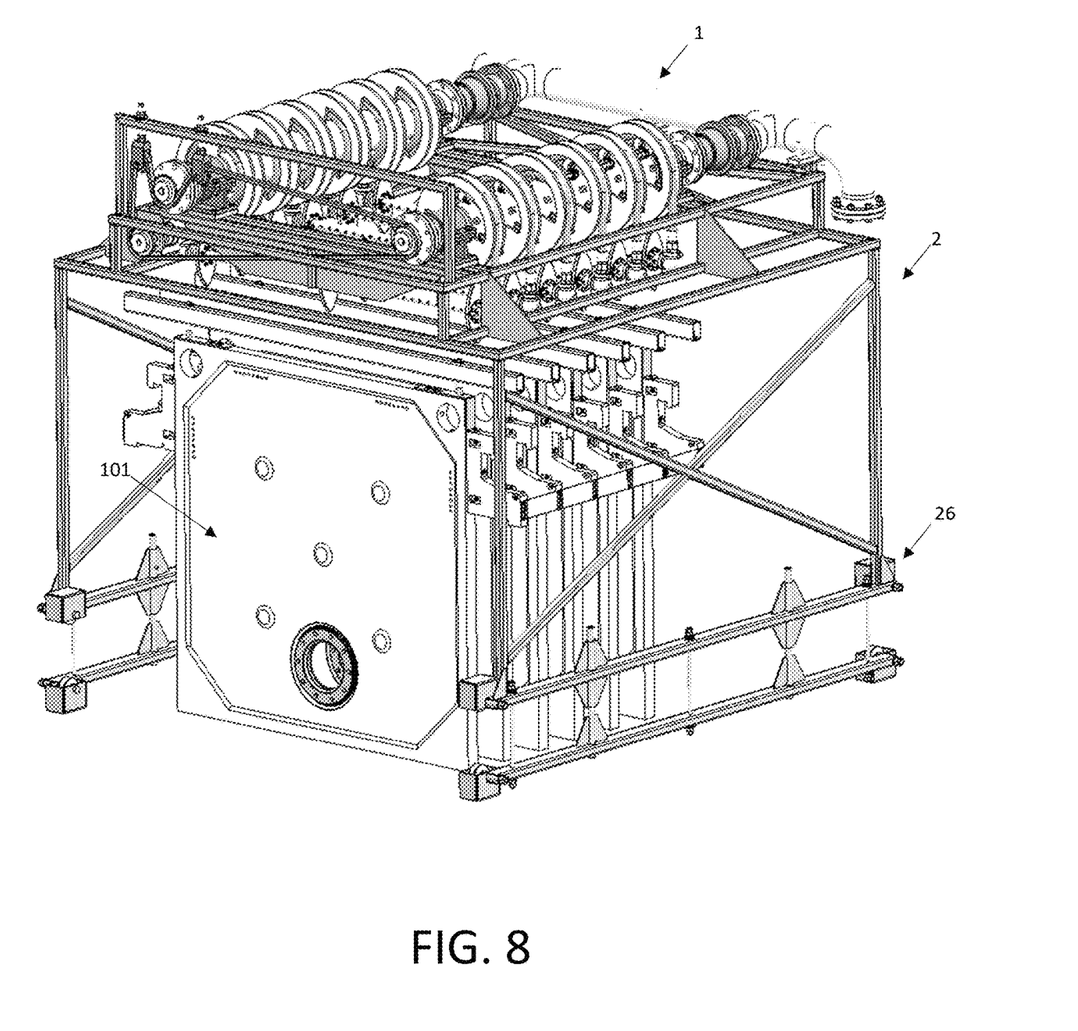
FIG. 8 shows how the device of FIG. 7 is oriented in relation to a number of filter plate assemblies 101 on a horizontal filter press 100.
Figure 9:
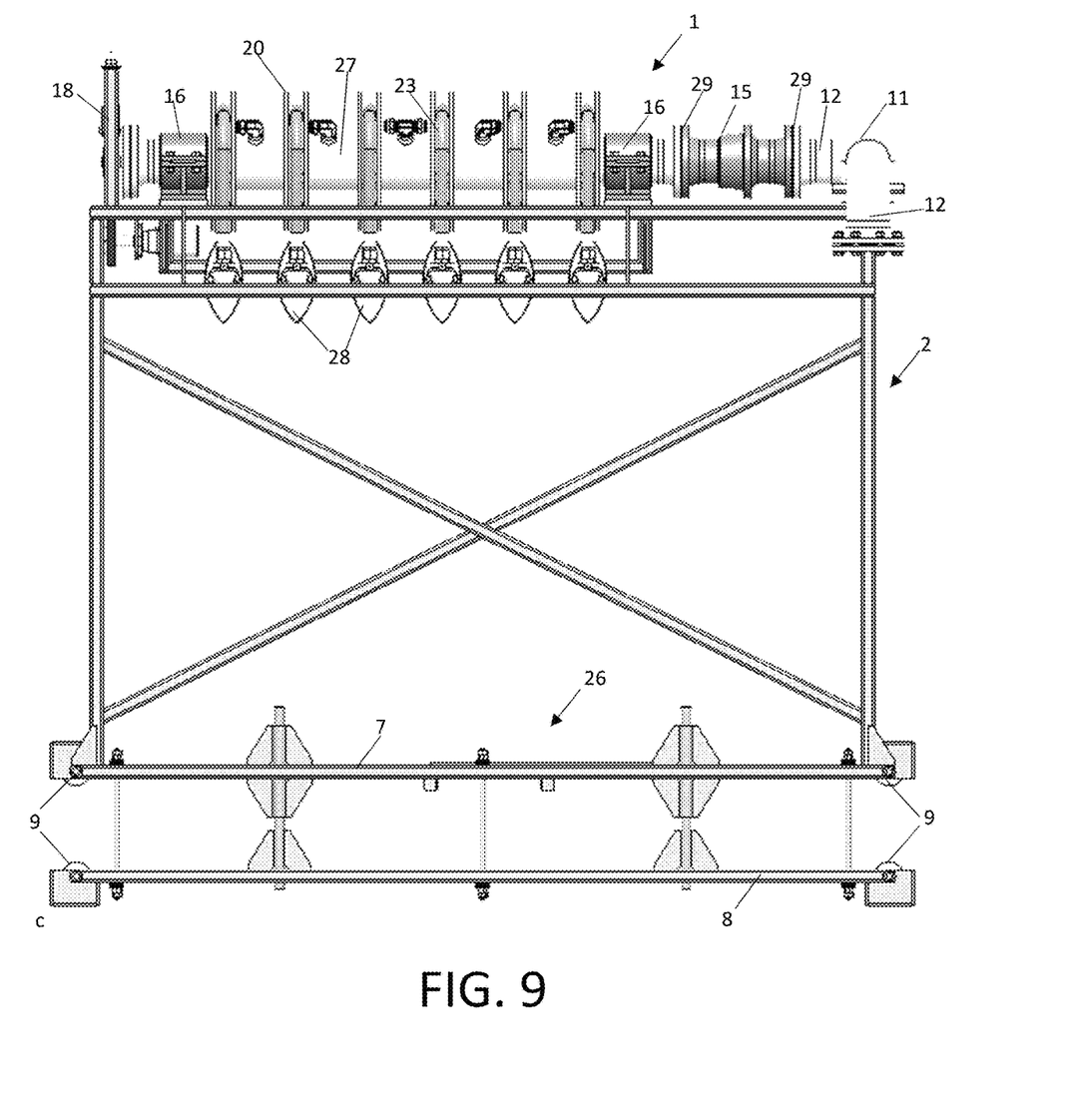
FIG. 9 is a side profile view of FIG. 7.
Figure 10A:
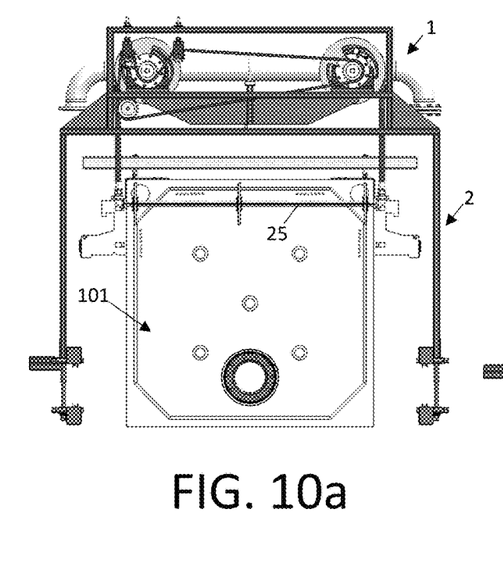
FIGS. 10a-10d depict end plan views showing how spray bars 25 may travel downward between filter plate assemblies 101 to wash portions thereof, including filter media.
Figure 10B:
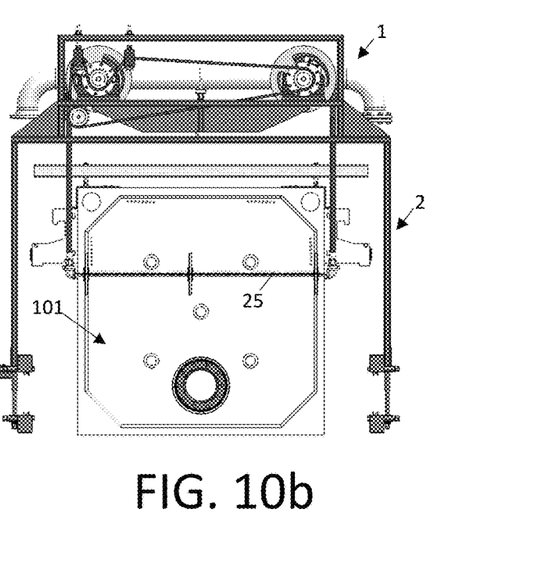
Figure 10C:
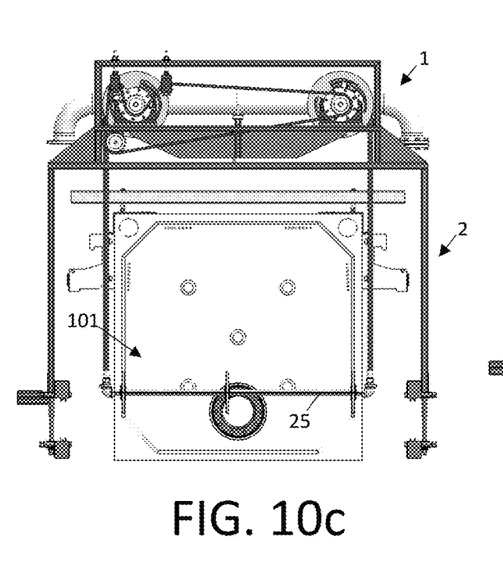
Figure 10D:
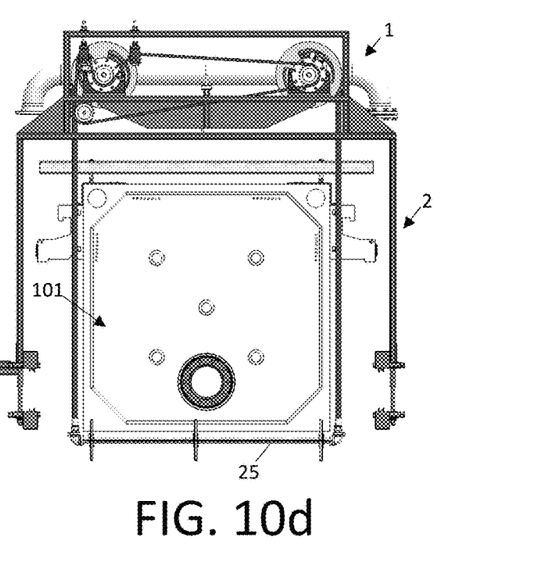
Figure 11A:
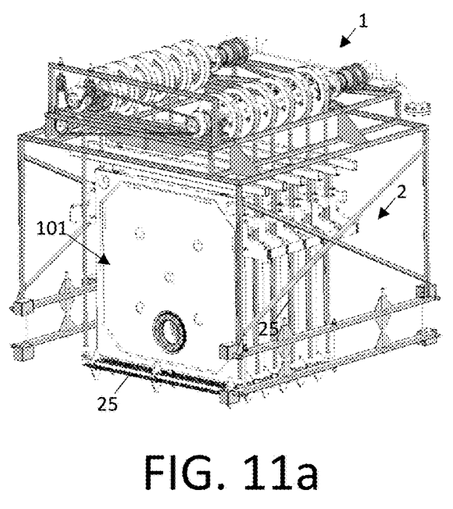
FIGS. 11a-11d isometrically depict how spray bars 25 may travel back upward between filter plate assemblies 101 to return to a standby wash configuration.
Figure 11B:
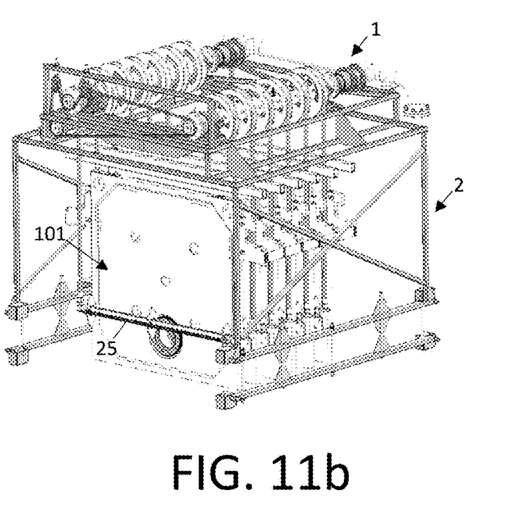
Figure 11C:
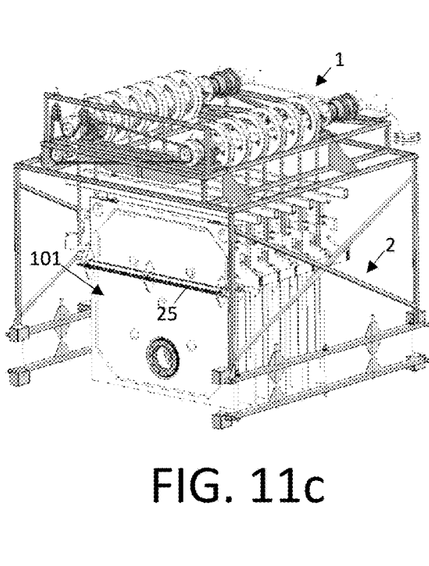
Figure 11D:
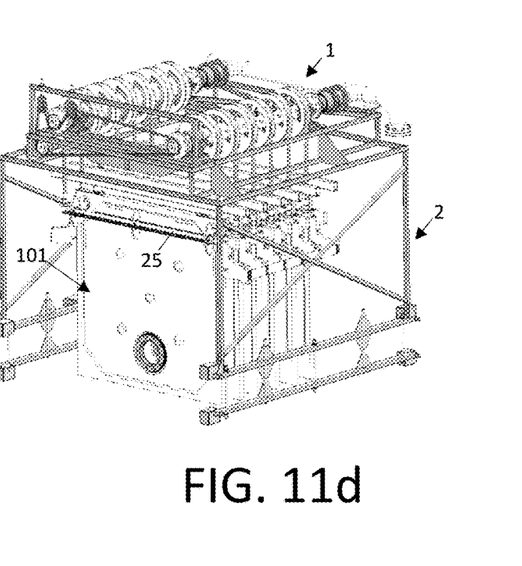
Figure 12A:
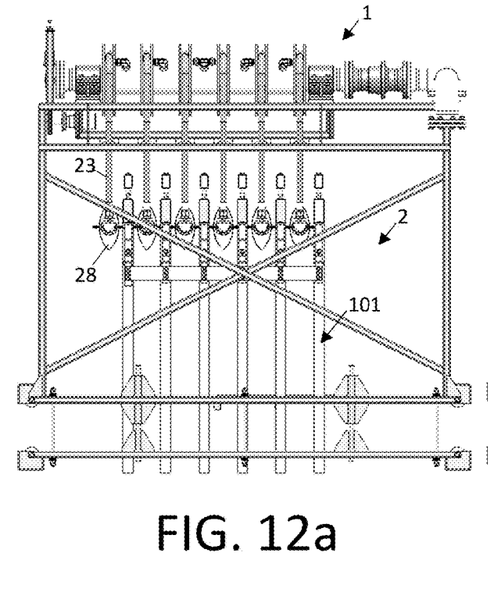
FIGS. 12a-12d depict side views illustrating how plate guides 25 help spray bars 25 travel down between filter plate assemblies 101 during a wash cycle (e.g., in a wash configuration).
Figure 12B:
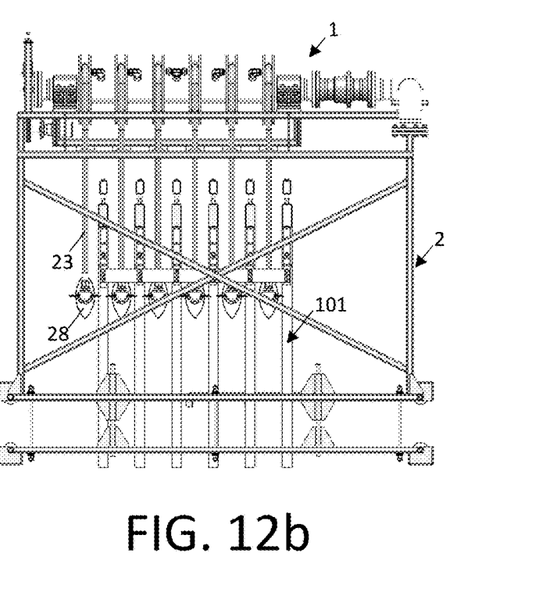
Figure 12C:
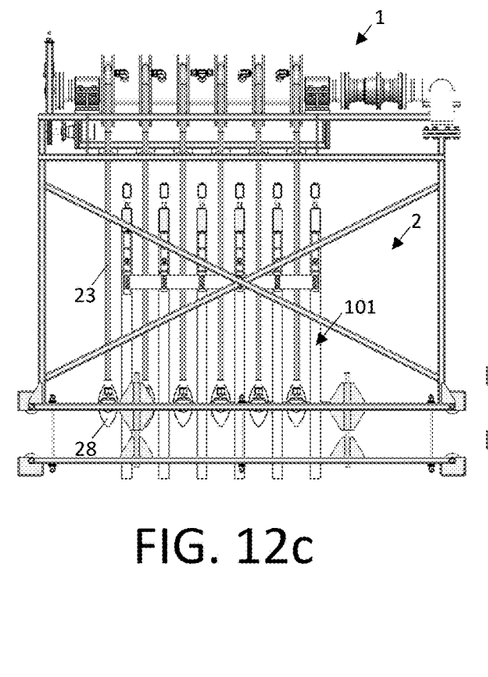
Figure 12D:
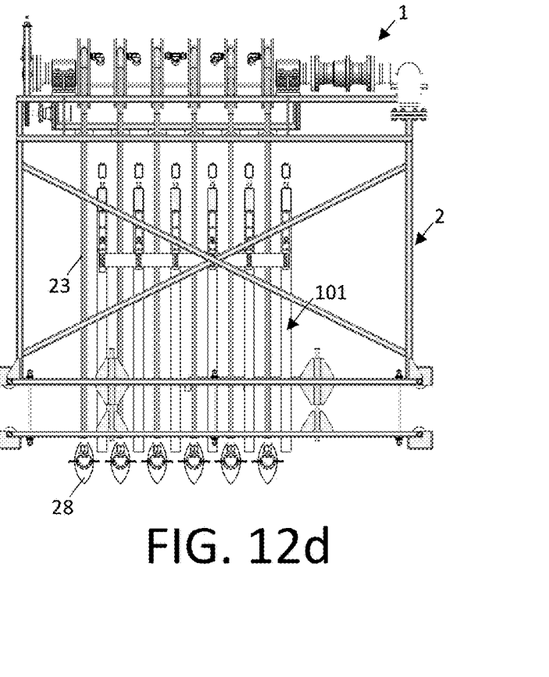

A washer carriage 2 comprises a track follower 26 on a first side 3 and a second side 4 thereof. Each track follower 26 comprises an upper end 7 and a lower end 8. The upper end 7 and/or lower end 8 are configured with guide means 9 (e.g., rollers or sliding surfaces) which is operatively configured to engage with tracks 105. In some embodiments, tracks 105 may comprise rollers on which track followers 26 slide, without limitation. The guide means 9 is configured to support and bear the weight of washer carriage 2 (including a washer unit 101) and further configured to allow the washer carriage 2 to move along tracks 105. Indexing means 10 may be provided to the washer carriage 2 in order to facilitate indexed movement of the washer carriage 2 along tracks 105. The indexing means 10 may comprise, for example, a shifter pawl plate which is configured to work with an existing shifter.

Figure 1:
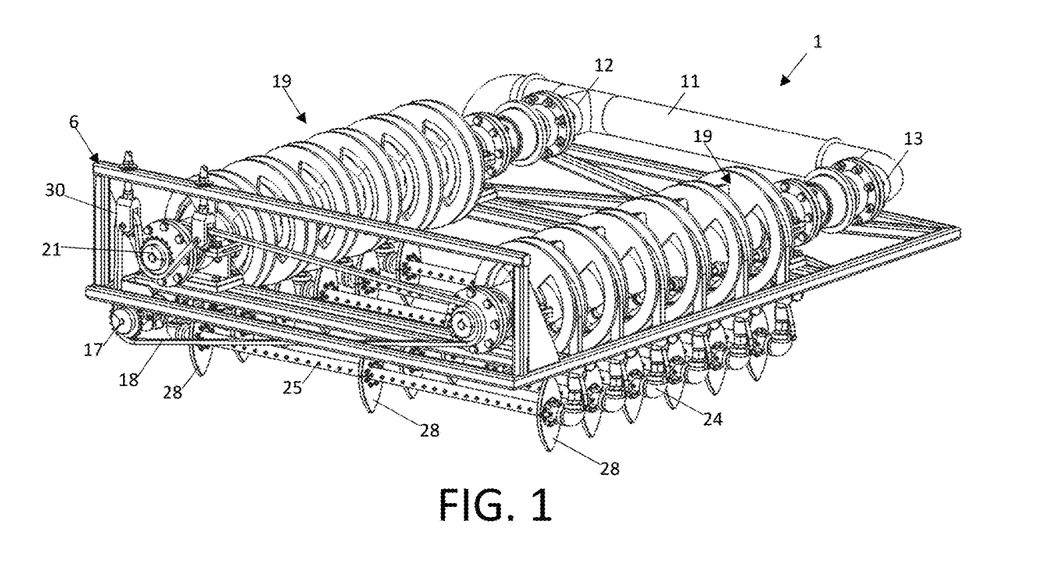
FIG. 1 shows an isometric view of a washer unit 1 according to some embodiments.
Figure 2:
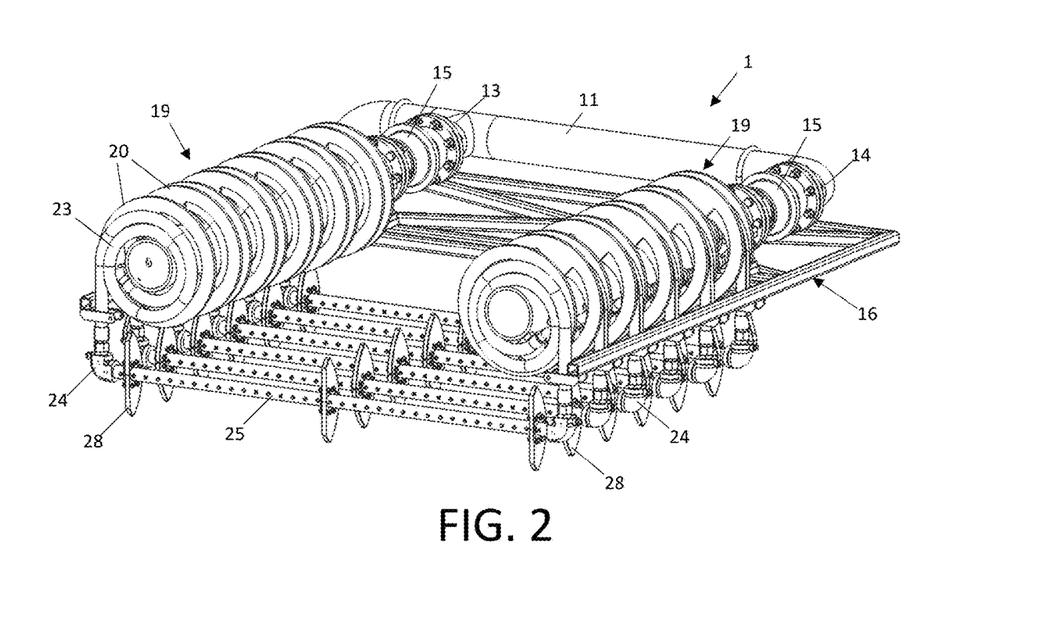
FIG. 2 is a partial cutaway view of FIG. 1, showing internals.
Figure 3:
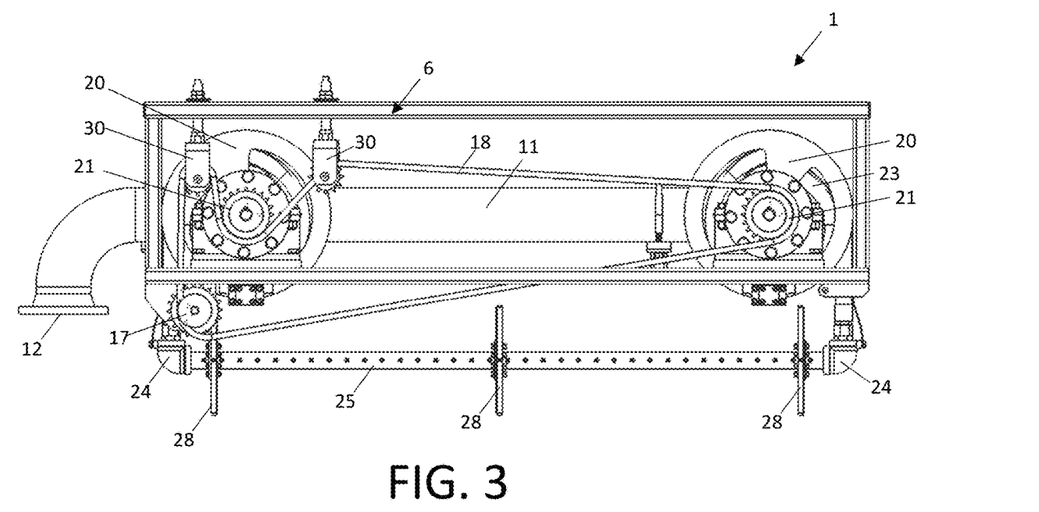
FIG. 3 is an end profile view of FIG. 1.

A filter plate assembly washer unit 1 is provided to a top side 5 of the washer carriage 2. The washer unit 1 is supported by a frame and mounting structure 6 which secures the washer unit 1 to the top side 5 of the washer carriage 2. The washer unit 1 comprises a wash water manifold 11 which receives wash water via an inlet 12. The inlet 12 may be connected to a pressurized source of wash water. The wash water manifold 11 delivers wash water to two spindles 19 via a first outlet 13 and a second outlet 14 extending perpendicularly from the wash water manifold 11. The spindles 19 are fluidly coupled to the first outlet 13 and second outlet 14 via hydraulic rotational fluid couplings 15 and one or more flanged connections 29 as shown.

Figure 4:
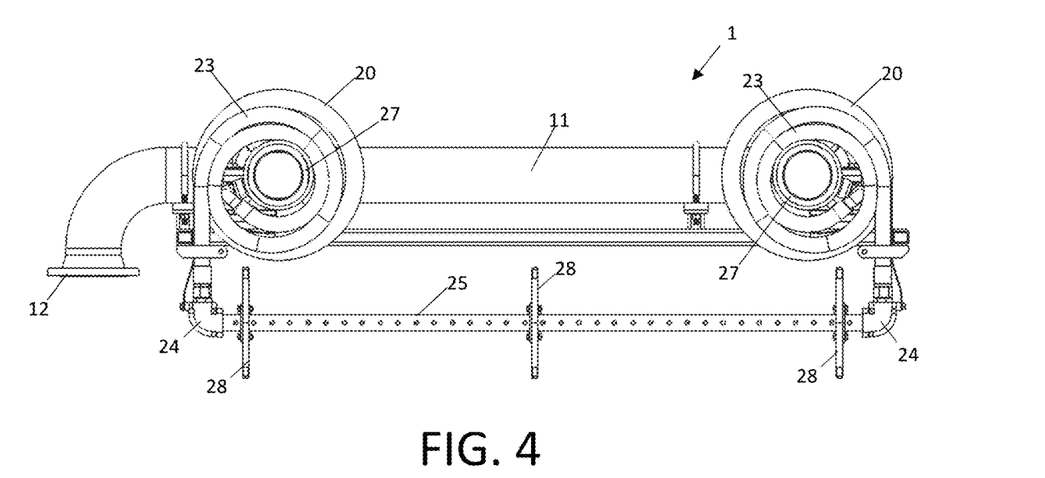
FIG. 4 is an end profile view of FIG. 2, viewing perpendicular to the cutaway plane.
Figure 5:
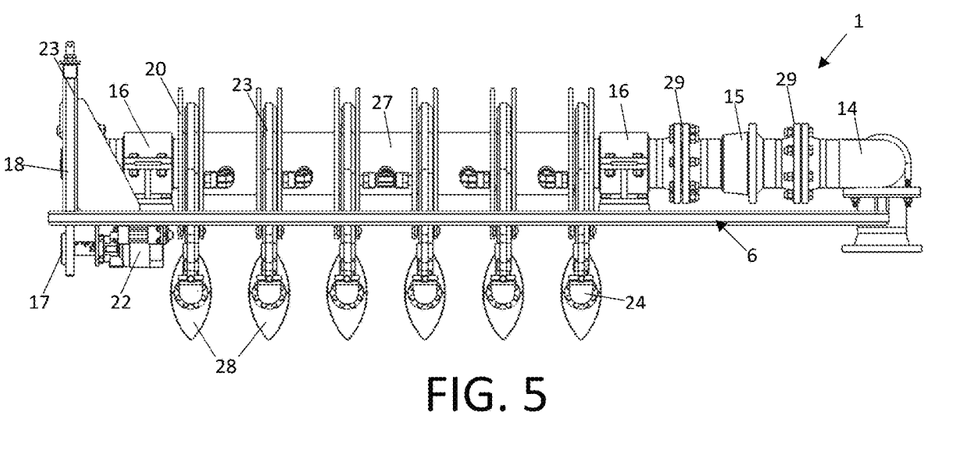
FIG. 5 is a side profile view of FIG. 1.
Figure 6:
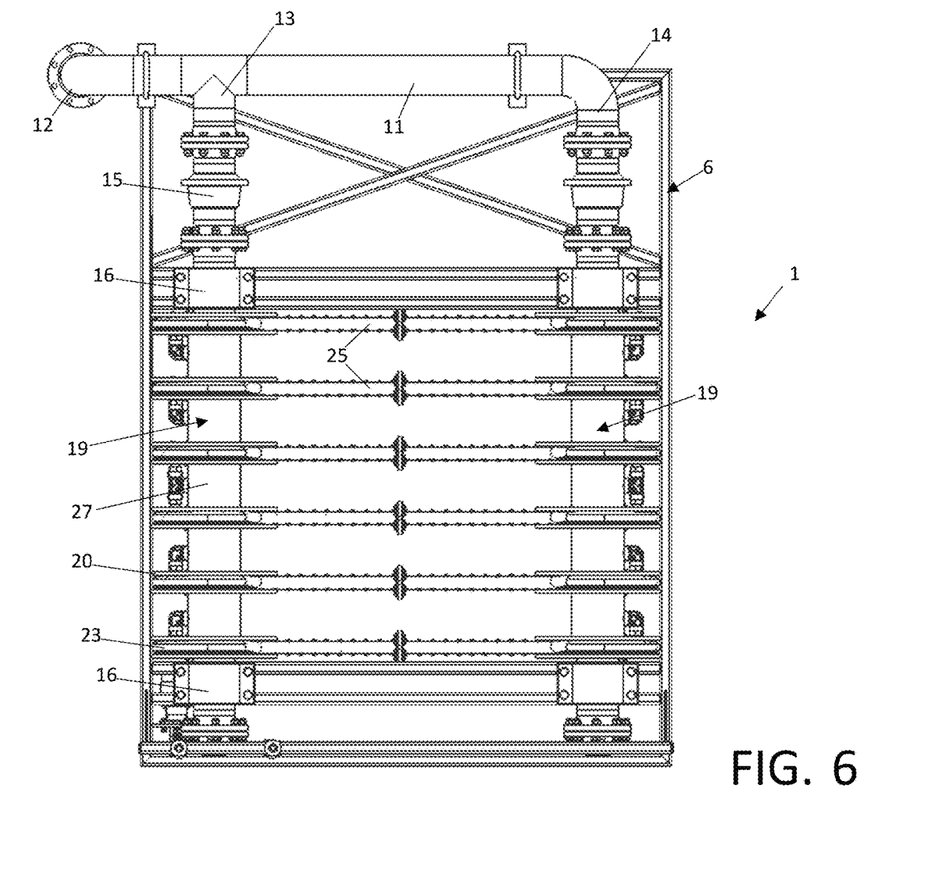
FIG. 6 is a top profile view of FIG. 1.

Each spindle 19 is supported by one or more bushings or bearings 16, for example, adjacent each end of the spindle 19 as shown. Each spindle 19 comprises a hollow shaft 27 fluidly communicating with the wash water manifold 11 via the hydraulic rotational fluid couplings 15. Radially-extending from the hollow shaft 27 of each spindle 19 is at least one reel 20. Preferably, a plurality of axially-spaced reels 20 radially-extend from each spindle 19. The reels 20 are each configured to store, deploy, and retract a flexible hose 23.

A first (proximal) end of a flexible hose 23 provided to each reel 20 fluidly communicates with the hollow shaft 27 of its respective spindle 19. In this regard, the first (proximal) end of the flexible hose may be attached to the hollow shaft 27 via a hydraulic fitting. At the other (distal) end of the flexible hose 23, a hydraulic fitting 24 is provided. The hydraulic fitting 24 fluidly couples the flexible hose 23 to an end of a spray bar 25.

Each spray bar 25 may be configured with openings (e.g., small holes, nozzles, orifices, apertures, or the like)—and it is these openings which are configured deliver wash water to surface portions of respective filter plate assemblies 101. The hydraulic fittings 24 connecting spray bars 25 to flexible hoses 23 may be ideally configured to maintain an orientation of the spray bars 25 during raising and lowering of spray bars 25 between filter plate assemblies 101 (refer to FIGS. 10*a*-12*d*).

To raise or lower spray bars 25 between filter plate assemblies, the spindles 19 may be rotated. Rotation of spindles 19 may, for example, be facilitated by a drive motor 22 mounted to the frame and mounting structure 6 and/or washer carriage 2. In the particular exemplary non-limiting embodiment shown, the drive motor 22 comprises a drive pulley, gear, or sprocket 17 mounted to its drive shaft. The drive pulley, gear, or sprocket 17 drives rotation of a drive belt or chain 18. Each spindle 19 may comprise a driven pulley, gear, or sprocket 21 which engages with the drive belt or chain 18. Accordingly, inputs to drive motor 22 turn the drive belt or chain 18, which, in turn, drive rotation of spindles 19.

As the spindles 19 rotate, the flexible hoses 23 are spooled onto or released from their respective reels 20. Spooling flexible hoses 23 onto their respective reels 20 raises the spray bar 25 location with respect to filter plate assemblies 25. To lower spray bars 25 with respect to filter plate assemblies 25, the flexible hoses 23 may be unwound from their respective reel 20 by reversing rotation of the spindles 19. Tensioning means 30, such as the depicted idlers with spring-biased tensioners may maintain even tension on the drive belt or chain 18, and may serve to keep the same in contact with drive 17 and driven 21 pulleys, gears, or sprockets. In some embodiments, tensioning means 30 may include pneumatic or hydraulic cylinders, solenoids, or other dampener known in the art.

Each spray bar 20 may comprise one or more plate guides 28 to help maintain orientation of the spray bar 20 throughout a wash cycle, and/or to help evenly guide the spray bars 20 between the filter plate assemblies 101.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

REFERENCE NUMERAL IDENTIFIERS

1 Filter plate assembly washer unit
2 Washer carriage
3 First side
4 Second side
5 Top side
6 Frame and mounting structure
7 Upper end
8 Lower end
9 Guide means (e.g., rollers, sliding surfaces)
10 Indexing means (e.g., shifter pawl plate)
11 Wash water manifold
12 Inlet
13 First outlet
14 Second outlet
15 Hydraulic rotational fluid coupling
16 Bushing or bearing
17 Drive pulley, gear, or sprocket
18 Drive belt or chain
19 Spindle
20 Reel
21 Driven pulley, gear, or sprocket
22 Drive motor
23 Flexible hose
24 Hydraulic fitting
25 Spray bar
26 Track follower(s)
27 Hollow shaft
28 Plate guide
29 Flanged connection
30 Tensioning means (e.g., idler with tensioner)
100 Horizontal filter press
101 Filter plate assembly
102 Head end
103 Tail end
104 Side bar(s)
105 Track

What is claimed is:

1. A horizontal filter press having a plurality of filter plate assemblies supported by side bars, and a track; the horizontal filter press further comprising a washer carriage; the washer carriage being movably supported on the track and comprising a washer unit for washing the filter plate assemblies; the washer unit comprising:

a wash water manifold which receives wash water via an inlet; the inlet being configured to be connected to a pressurized source of wash water;

a plurality of reels that are each configured to store, deploy, and retract a flexible hose;

at least one spray bar configured for lowering between two of the filter plate assemblies and being fluidly coupled to first and second flexible hoses by a hydraulic fitting; the spray bar being further configured with openings which are configured to deliver the wash water towards surface portions of the filter plate assemblies;

wherein a first end of the spray bar fluidly communicates with the first flexible hose;

wherein a second end of the spray bar fluidly communicates with the second flexible hose;

wherein the washer unit is configured such that spooling the first and second flexible hoses onto respective first and second ones of said plurality of reels raises a location of the spray bar with respect to the filter plate assemblies;

wherein the washer unit is configured such that spooling the first and second flexible hoses from the respective first and second ones of said plurality of reels lowers a location of the spray bar with respect to the filter plate assemblies;

wherein in a standby configuration, the first and second flexible hoses are wrapped around said respective first and second ones of said plurality of reels;

wherein in a wash configuration, the first and second flexible hoses are at least partially unwrapped from said respective first and second ones of said plurality of reels.

2. The horizontal filter press according to claim 1, wherein the wash water manifold comprises a first outlet for feeding water to a first spindle.

3. The horizontal filter press according to claim 1, wherein the wash water manifold comprises a second outlet for feeding water to a second spindle.

4. The horizontal filter press according to claim 2, wherein the first spindle is coupled to the first outlet by a hydraulic rotational fluid coupling.

5. The horizontal filter press according to claim 2, wherein the first spindle comprises a hollow shaft which receives the wash water from the wash water manifold.

6. The horizontal filter press according to claim 3, wherein the second spindle is coupled to the second outlet by a hydraulic rotational fluid coupling.

7. The horizontal filter press according to claim 3, wherein the second spindle comprises a hollow shaft which receives the wash water from the wash water manifold.

8. The horizontal filter press according to claim 1, wherein the spray bar comprises at least one guide plate configured for aligning the spray bar between two of the filter plate assemblies during a wash cycle.

9. A method of using/operating the horizontal filter press according to claim 1 comprising:
providing the horizontal filter press according to claim 1;
providing wash water to the inlet of the wash water manifold;
providing wash water from the wash water manifold to the spray bar via the first and second flexible hoses;
spooling the first and second flexible hoses onto respective first and second ones of the reels to raise the spray bar; and
unraveling the first and second flexible hoses from respective first and second ones of the reels for lowering the spray bar.

10. The method according to claim 9, further comprising:
lowering the spray bar between two of the filter plate assemblies.

11. The method according to claim 9, further comprising:
allowing at least one plate guide provided to the spray bar to align the spray bar between two of the plurality of filter plate assemblies during a wash cycle.

* * * * *